United States Patent [19]

Wellman

[11] Patent Number: 5,068,790
[45] Date of Patent: Nov. 26, 1991

[54] WIRE GUIDANCE CONTROL SYSTEM

[75] Inventor: Tim A. Wellman, Coldwater, Ohio

[73] Assignee: Crown Equipment Corporation, New Bremen, Ohio

[21] Appl. No.: 446,847

[22] Filed: Dec. 6, 1989

[51] Int. Cl.[5] ............................................. G06F 15/50
[52] U.S. Cl. ............................... 364/424.02; 318/587; 180/168
[58] Field of Search .................... 364/424.02; 340/457, 340/459, 460, 465; 318/587, 590, 591; 180/167, 168, 170

[56] References Cited

U.S. PATENT DOCUMENTS 4,530,056  7/1985  MacKinnon et al. .......... 364/424.02
4,626,995  12/1986  Lofgren et al. ................ 364/424.02
4,800,977  1/1989  Boegli et al. ................... 364/424.02

Primary Examiner—Gary Chin
Attorney, Agent, or Firm—Biebel & French

[57] ABSTRACT

A wire guidance system for a materials handling vehicle, such as a turret stockpicker, detects an alternating signal carried by a buried wire. Two sets of four sensors each are carried at either end of the vehicle. The distance and angle of the vehicle is determined by reference to the distance measurements of each sensor set, as calculated by a microcomputer. Deviations in the angle or speed from predetermined limits will cause brakes to be applied and require operator intervention before the vehicle can be restarted.

4 Claims, 10 Drawing Sheets

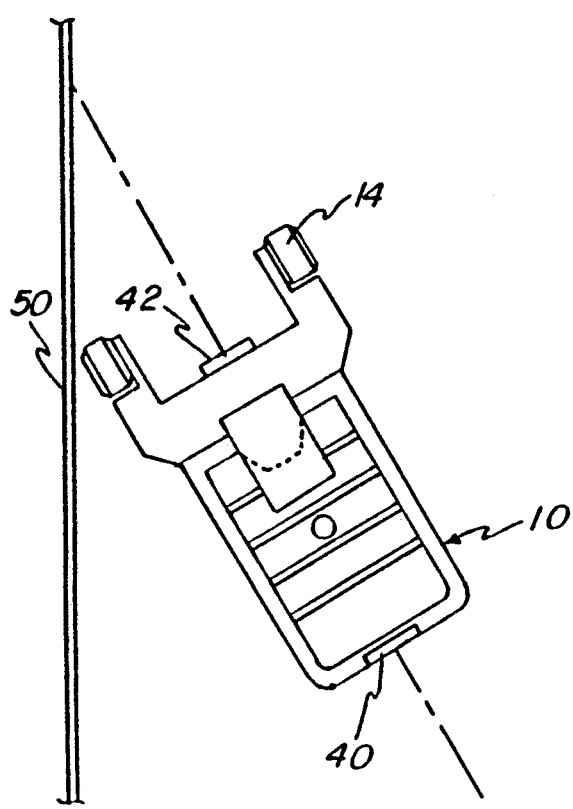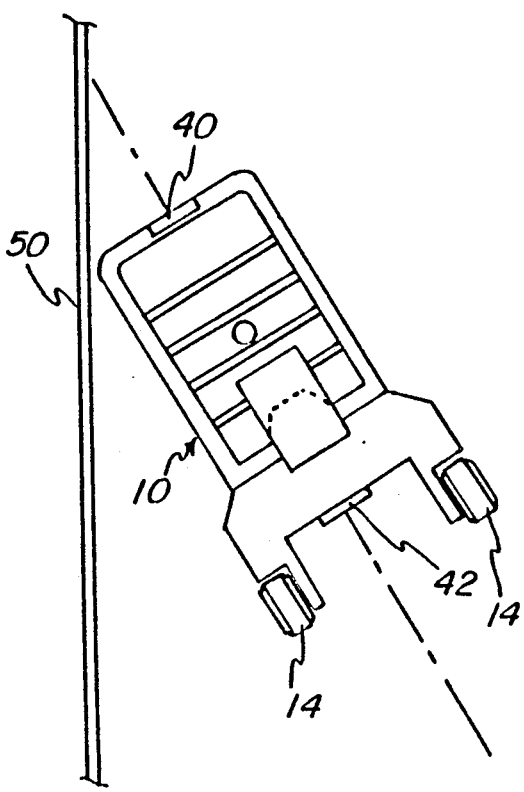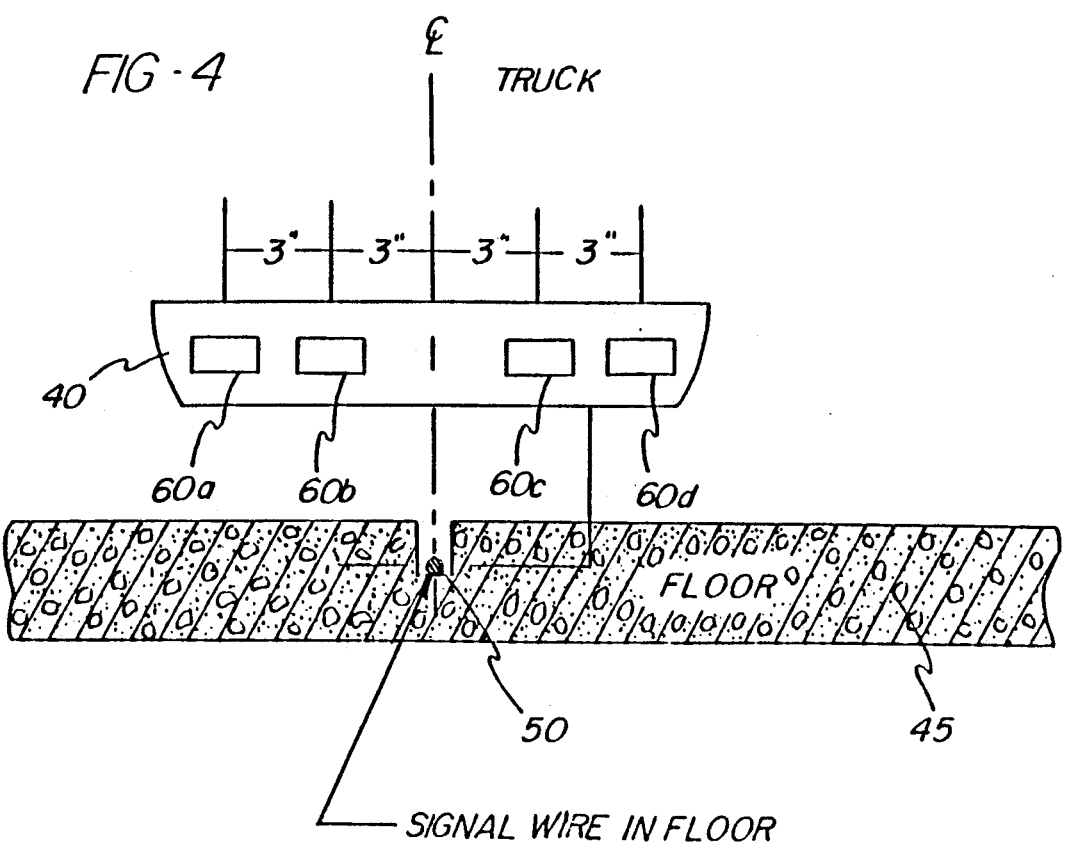

WIRE GUIDANCE CONTROL SYSTEM

BACKGROUND OF THE INVENTION

This invention relates to wire guided material handling vehicles, and particularly the control of such vehicles when the signal from the signal carrying wire is lost.

When a wire guided vehicle is in the automatic mode, or when the operator is attempting to engage the automatic guidance system, it is important that the vehicle's speed and relation to the wire be within those limits that will allow the guidance system to position the vehicle quickly and without significant overshoot. There are some circumstances where manual control of the vehicle is preferred over automatic control, especially when initially positioning the vehicle over the wire, since the operator can maneuver the vehicle backwards and forwards, if necessary, to achieve proper position.

SUMMARY OF THE INVENTION

The purpose of this invention is to provide a control mechanism for a wire guided materials handling vehicle wherein the speed of the vehicle, its position relative to the wire, and its mode of operation are considered, and if these parameters, or a combination of them, are beyond certain limits, the brakes of the vehicle will be applied and operator intervention required before further vehicle movement is permitted.

For turret stockpickers, and other materials handling vehicles, approaching a buried wire carrying a signal for use by a wire guidance system must be done properly, before the guidance system is engaged. In the present invention, if the angle of that approach exceeds 35 degrees, or if the speed of the vehicle exceeds 1.8 mph, and the wire guidance mode is selected, then the vehicle's brakes will be immediately applied.

It is therefore an object of this invention to provide an improved wire guidance system wherein the vehicle's speed and angle of approach are monitored and if either exceeds predetermined limits, the vehicle's brakes will be applied immediately.

Other objects and advantages of the invention will be apparent from the following description, the accompanying drawings and the appended claims.

BRIEF DESCRIPTION OF THE DRAWINGS

FIG. 3A is a plan view showing a vehicle approaching a buried wire in the forward direction;

FIG. 3B is a plan view showing a vehicle approaching a buried wire in the reverse direction;

FIG. 4 is an elevational view showing the relationship between a sensor bar that includes four sensor coils relative to a guidance wire buried in a concrete floor;

DESCRIPTION OF THE PREFERRED EMBODIMENT

Figure 1:
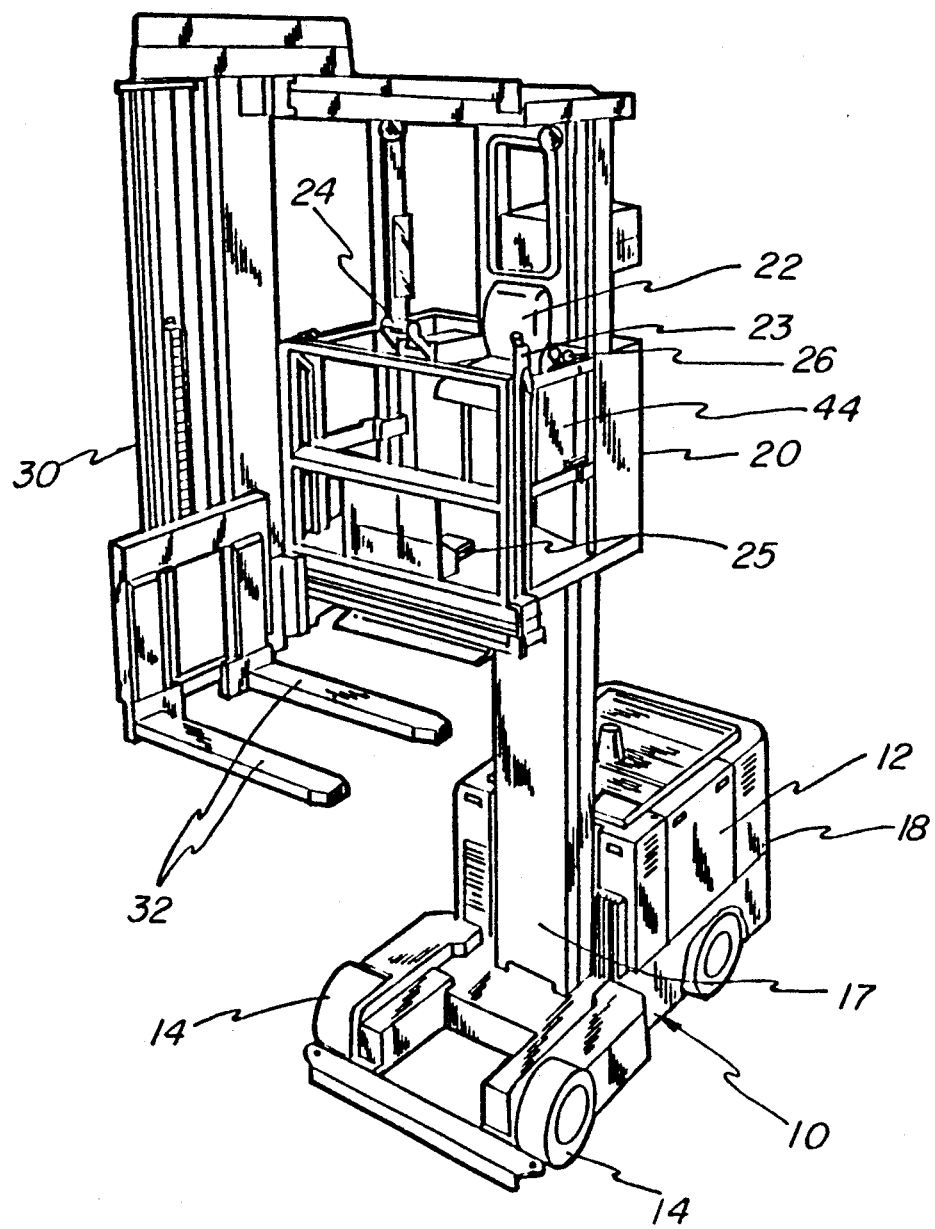
FIG. 1 is perspective view of turret stock picker which is representative of the type of vehicle that includes automatic guidance.

Referring now to the drawings and particularly to FIG. 1 which illustrates a forklift truck of the type including a wire guidance system, the truck may include a power unit 10, a platform assembly 20, and a load handling assembly 30.

Figure 2:
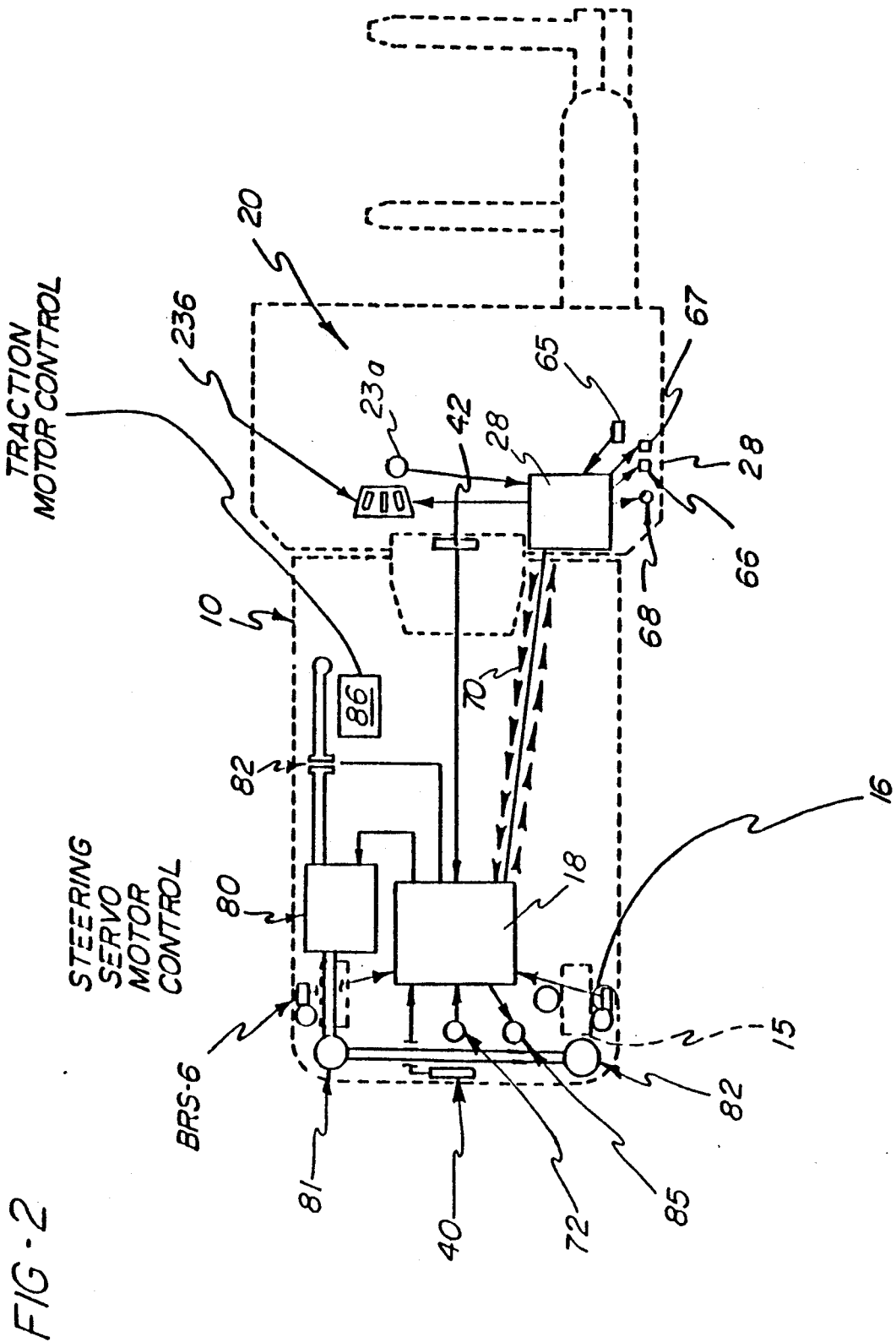
FIG. 2 is a schematic plan view showing some of the major components comprising the vehicle control system.

The power unit 10 includes a power source, such as a battery unit 12, a pair of load wheels 14 positioned under the platform assembly, a pair of steered wheels 15 (FIG. 2) positioned under the rear end of the power unit 10 with each wheel being driven by a traction motor 16, a mast 17 on which the platform assembly 20 rides, and a power unit electronic control unit 18 (FIG. 2).

The platform assembly 20 includes a seat 22 from which the operator can control a steering tiller 23, traction motor control 24, brake pedals 25 and forklift controls 26. The platform assembly 20 includes an electronics package 28 which is interconnected with the power unit electronics package 18 by means of appropriate electrical cables.

The load handling assembly 30 includes a pair of lift forks 32 which may be raised and lowered, and also rotated relative to the platform assembly by the controls 26.

As illustrated in FIG. 2, the power unit 10 supports two sensor bars 40 and 42. Sensor bar 40 is located between the steerable wheels while the sensor bar 42 is placed between the load wheels 14. Both sensor bars are designed to detect a wire 50 embedded in the floor of the warehouse.

Figure 5:
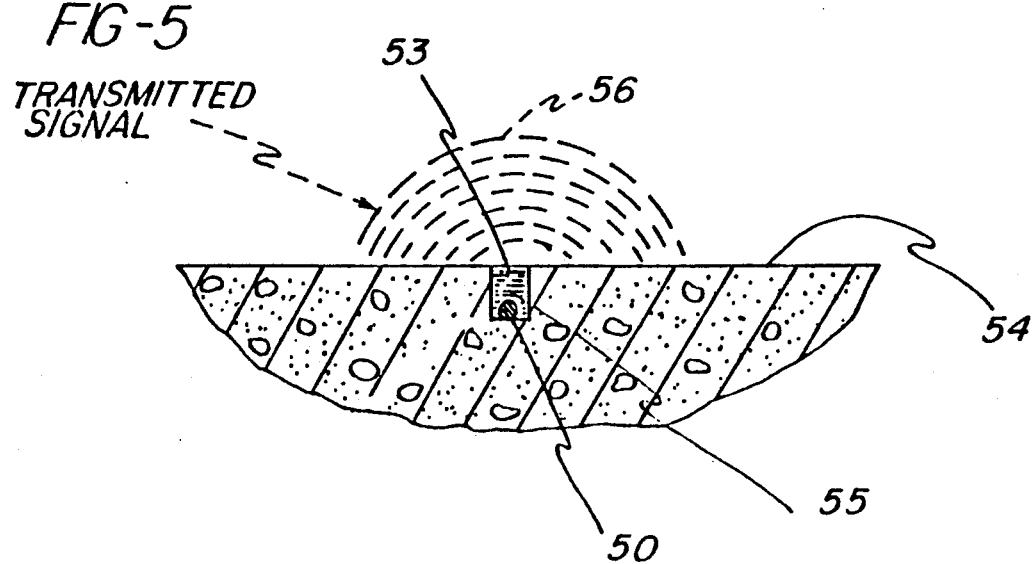
FIG. 5 is an elevational view showing the radiation pattern emanating from a sinusoidal signal carried by a buried wire.
Figure 6:
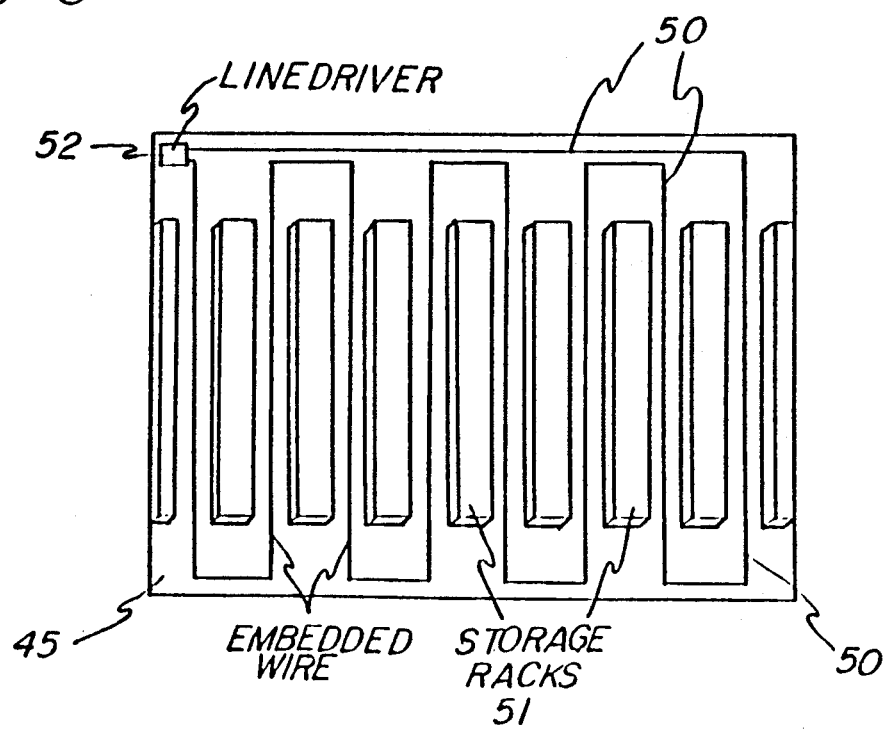
FIG. 6 is a plan view illustrating a buried guidance wire placed between storage racks in a typical warehouse.

As shown in FIG. 6, the embedded wire 50 is placed down the center of the narrow aisles between the storage racks 51 in a warehouse. A line driver 52 causes current to pass through the wire at a frequency in the range of from 4-12 kHz. As shown in FIG. 5, the wire 50 is embedded in a saw cut 53 made in the floor 54, and it is held in place by epoxy 55 which fills the remainder of the cut after the wire has been placed in the bottom thereof. The wire will radiate a signal, shown by the dashed lines 56 in FIG. 5, which signal may be detected by sensor coils carried by either or both of the sensor bars 40 or 42.

Referring now to FIG. 4, four sensor coils 60 are carried by each of the sensor bars 40, 42. The axis of each coil is horizontal to the floor 54. Coil 60a is placed six inches to the left of the center line of the sensor bar, coil 60b is three inches to the left, coil 60c is three inches to the right, and coil 60d is 6 inches to the right of the center line. The centers of each coil are a nominal 4 inches above the wire 50. Each coil 60 is approximately 1 inch in length, and ⅜ inch in diameter.

Referring again to FIG. 2, the steering tiller 23, traction motor control 24, brakes 25 and fork lift controls 26, as well as the other controls on the platform assembly, are provided with position sensors encoders and switches, and signals from these devices are transmitted to the electronic control package 18 located in the power unit 10. For example, the platform assembly 20 includes a steering encoder 23a, steering indicator lights 23b to show the operator which direction the wheels have been turned, a guidance switch 65, a signal strength light 65, guidance indicator lights 67, and an alarm or horn 68.

A serial link 70 electrically connects the platform electronic control package 28 to the power unit electronic control package 18, which also receives further input signals from a steering feedback encoder 72 which indicates the actual position of the steering wheels, the steered wheeled sensor bar 40, the load wheel sensor bar 42, and the brake switch 74. It provides output signals to control the steering servomotors 81 and 82 through a steering motor control circuit 80, a steering contactor 84, a brake relay 85, and a traction motor control circuit 86.

Figure 7:
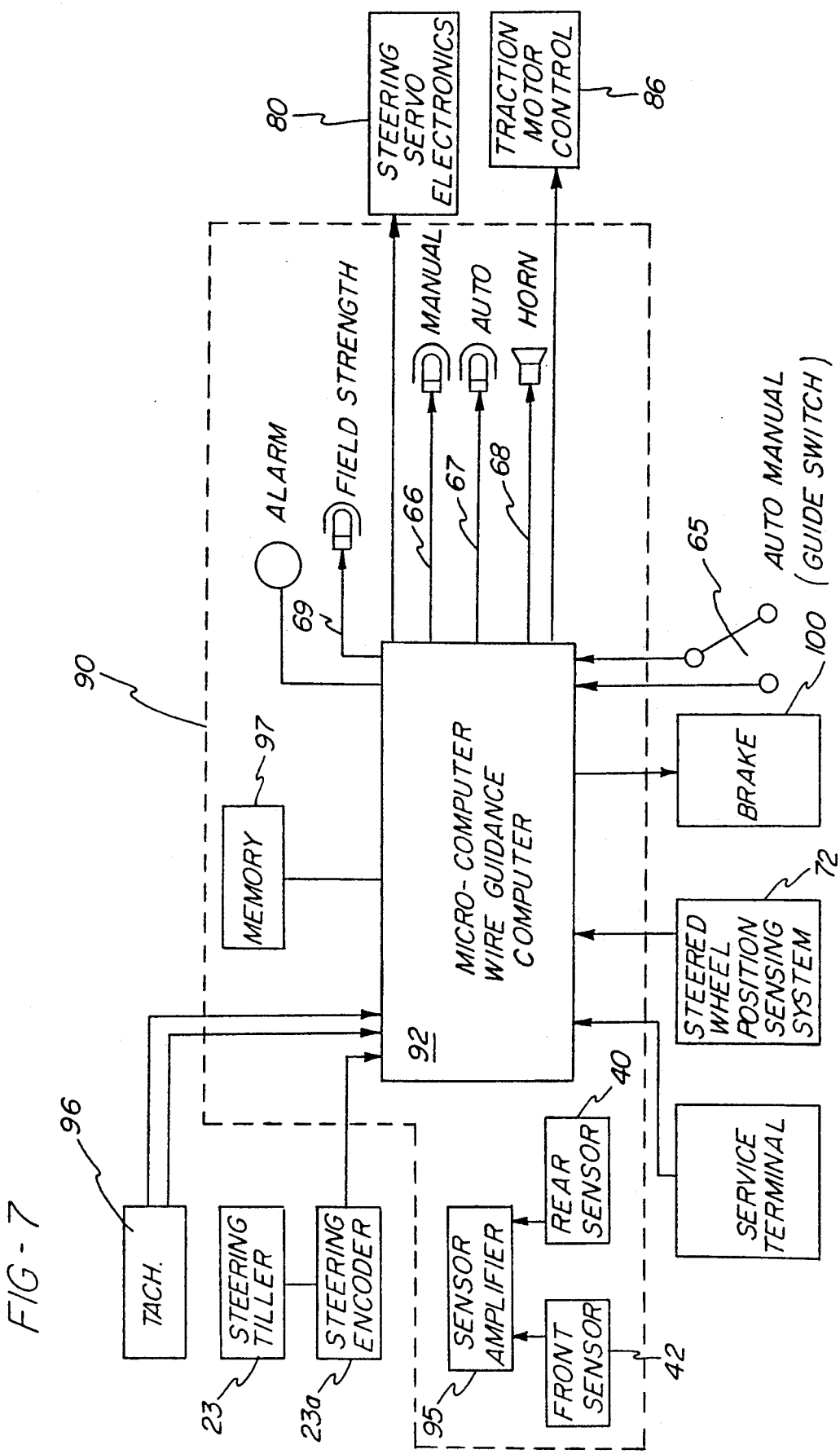
FIG. 7 is a simplified electrical block diagram showing the major components comprising of a guidance system.

The electronic components forming the present invention, are more clearly described in the block diagram of FIG. 7. A microcomputer wire guidance system 90 includes a microprocessor 92 that is provided with inputs from two sensor amplifiers 95a and 95b, and other inputs from the steered wheel position sensor 72, the steering encoder 23a, the guidance control switch 65, vehicle speed information from tachometers 96 associated with each of the steered wheels 15, and memory circuit 97 (which include predetermined speed and angle of approach limits). Outputs from the microcomputer 90 are provided to the traction motor control 86 for controlling the speed of the vehicle, to brake control 100 and to the steering servomotor control 80. Other outputs are provided to indicate to the operator when the vehicle is near an operating wire, that is, a wire which has the proper signal for use in a guidance system by means of the alarm horn 68 and field strength indicator light 66.

When the guidance selector switch 65 is in the manual position, the operator controls the steering of the vehicle directly by means of the steering tiller 23. When the guidance selector switch 65 is placed in the automatic position, the microcomputer 90 will automatically enter the search mode, and when either sensor 40 or 42 detects the guidance signal, the microcomputer 90 will automatically take the vehicle into an Acquisition Mode where the vehicle is guided into alignment with the wire. Once the vehicle is properly aligned, the microcomputer 90 will go into an Automatic Tracking Mode where the vehicle alignment is maintained automatically under computer control.

Figure 8:
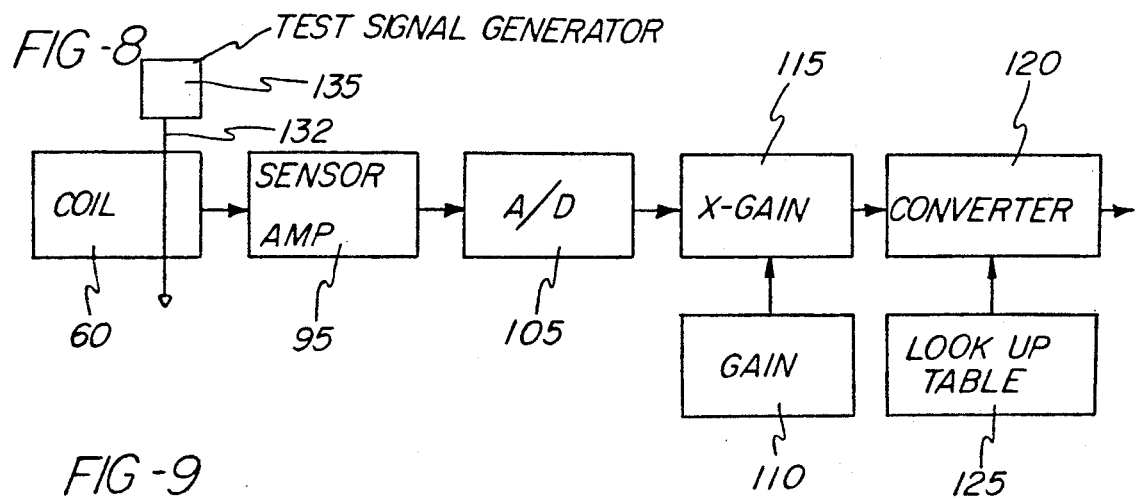
FIG. 8 is a electrical block diagram showing the basic components needed to convert the signal sensed by a single sensor coil to a distance measurement.

Each of the sensor coils is connected to its own amplifier 95, as illustrated in FIG. 8. Since the magnitude of the sinusoidal signal sensed by each sensor coil 60 is a function of the distance of that coil from the wire 50, the sensor amplifier 95 includes a dynamic clipper circuit to reduce the amount of unwanted noise and other signals not emanating from the wire itself. The output of the sensor amplifier 95 is then applied to the wire guidance computer 92.

The block diagram of FIG. 8 illustrates several components of the microcomputer 92 used in processing the signal with respect to a single sensor coil 60. One is an analog to digital (A/D) converter 105, which provides a digital representation of the voltage sensed by the sensor coil. A second is the gain factor memory 110 and multiplier circuit 115. The raw voltage output from the A/D 105 is normalized by multiplying it by a gain factor established for that coil during a calibration procedure. The output of the multiplier 115 is then compared by circuit 120 to the voltages in a look up table 125, which holds previously determined voltage-to-distance data. The output of the comparing circuit 120 therefore represents the distance of that particular coil from the wire 50.

Figure 9:
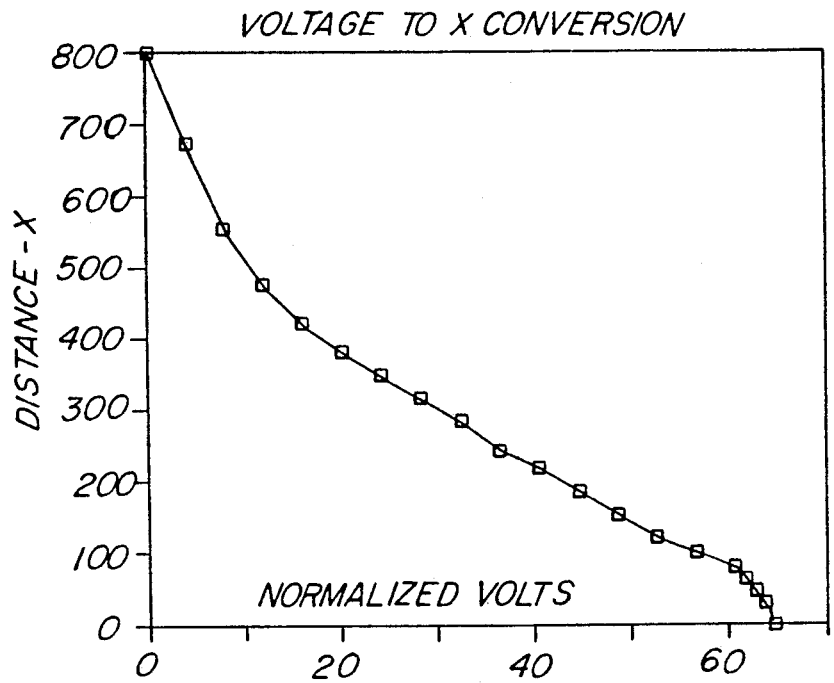
FIG. 9 is a curve showing the relationship between normalized sensor coil voltage and the distance of the coil from the buried wire.

The look up table 125 holds only a limited number of data points (only 64 in the preferred embodiment), and therefore a straightforward interpolation procedure is used to obtain distance measurements when the voltage output of a coil falls between these data points. The relationship between voltage and distance is represented in the curve of FIG. 9.

The microcomputer 92 will therefore sense the output of each of the sensor coils 60 individually, and by reference to a voltage level established during a calibration procedure, and the voltage-to-distance data in the look up table 125, the distance of the sensor coil from the buried wire ca then be calculated.

The center point 130 of each sensor bar 40, 42 is used as the reference from which later vehicle distance measurements are calculated. The distance of each coil from the wire is determined, as described above, and the coil that has the highest output (the coil closest to the wire) is identified.

Figure 10:
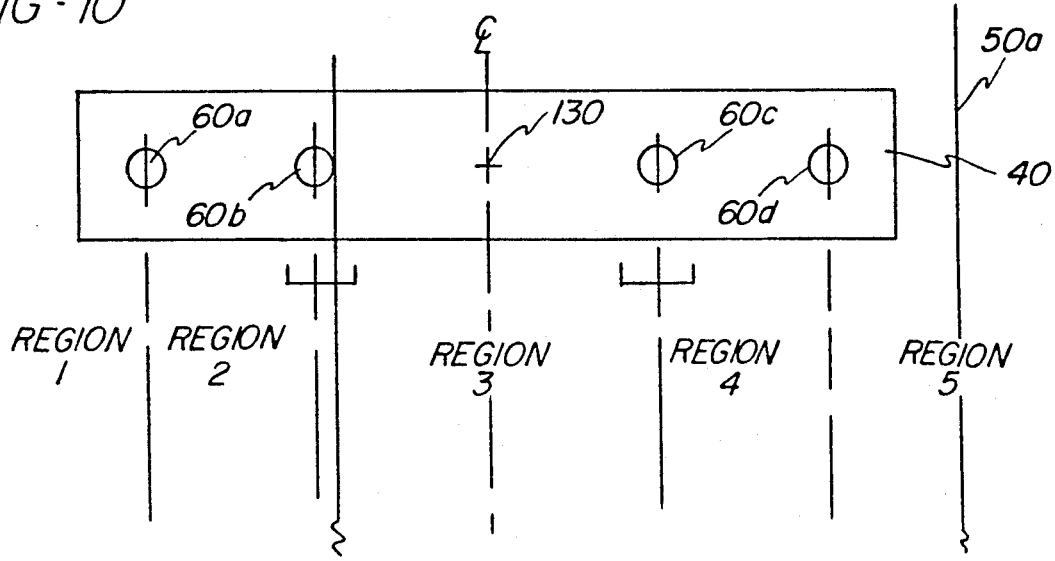
FIG. 10 is a plan view of the sensor bar showing the regions formed by the four coils in the bar.
Figure 11:
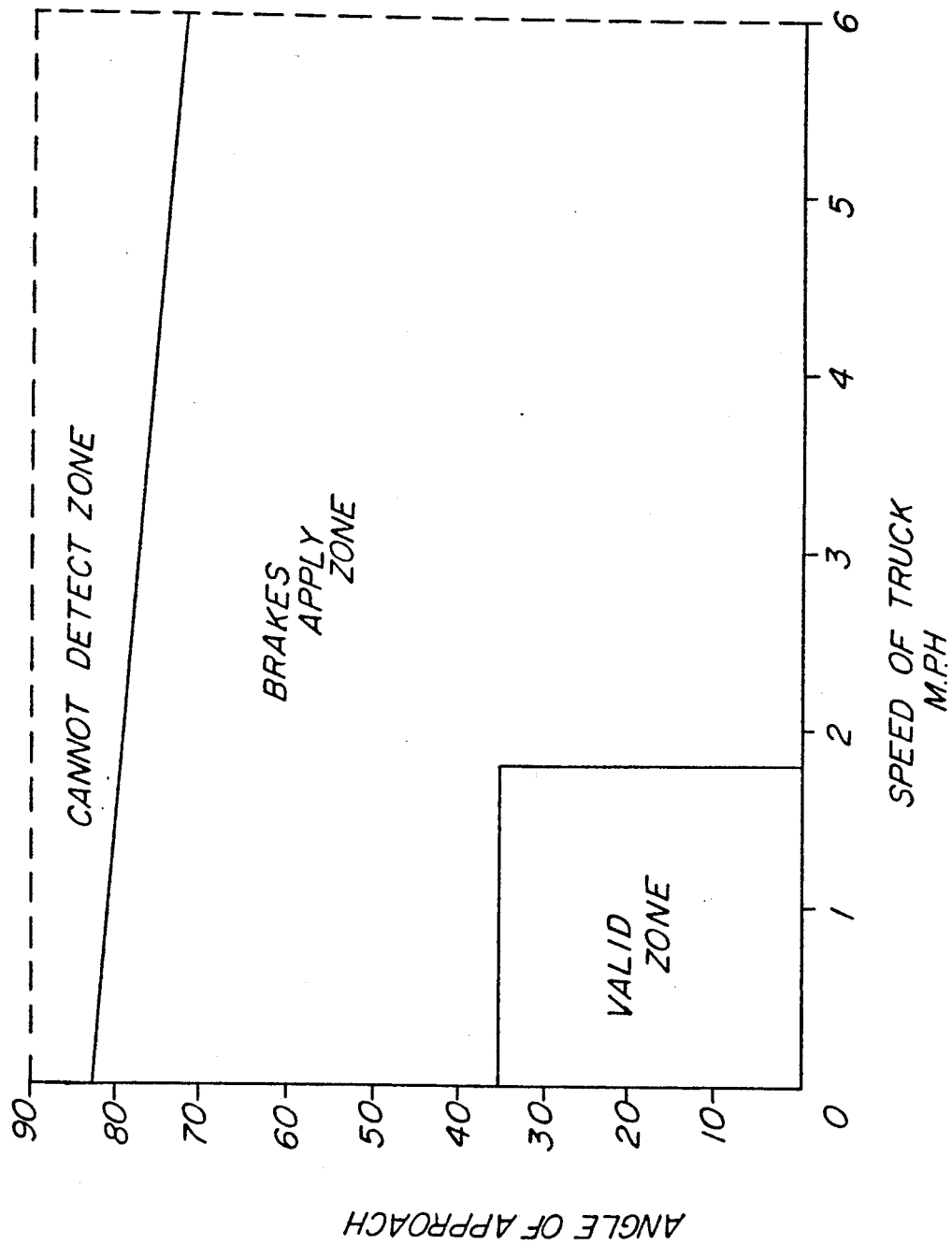
FIG. 11 is a response curve showing the zone of control of the guidance system at various vehicle speeds and approach angles.
Figure 12:
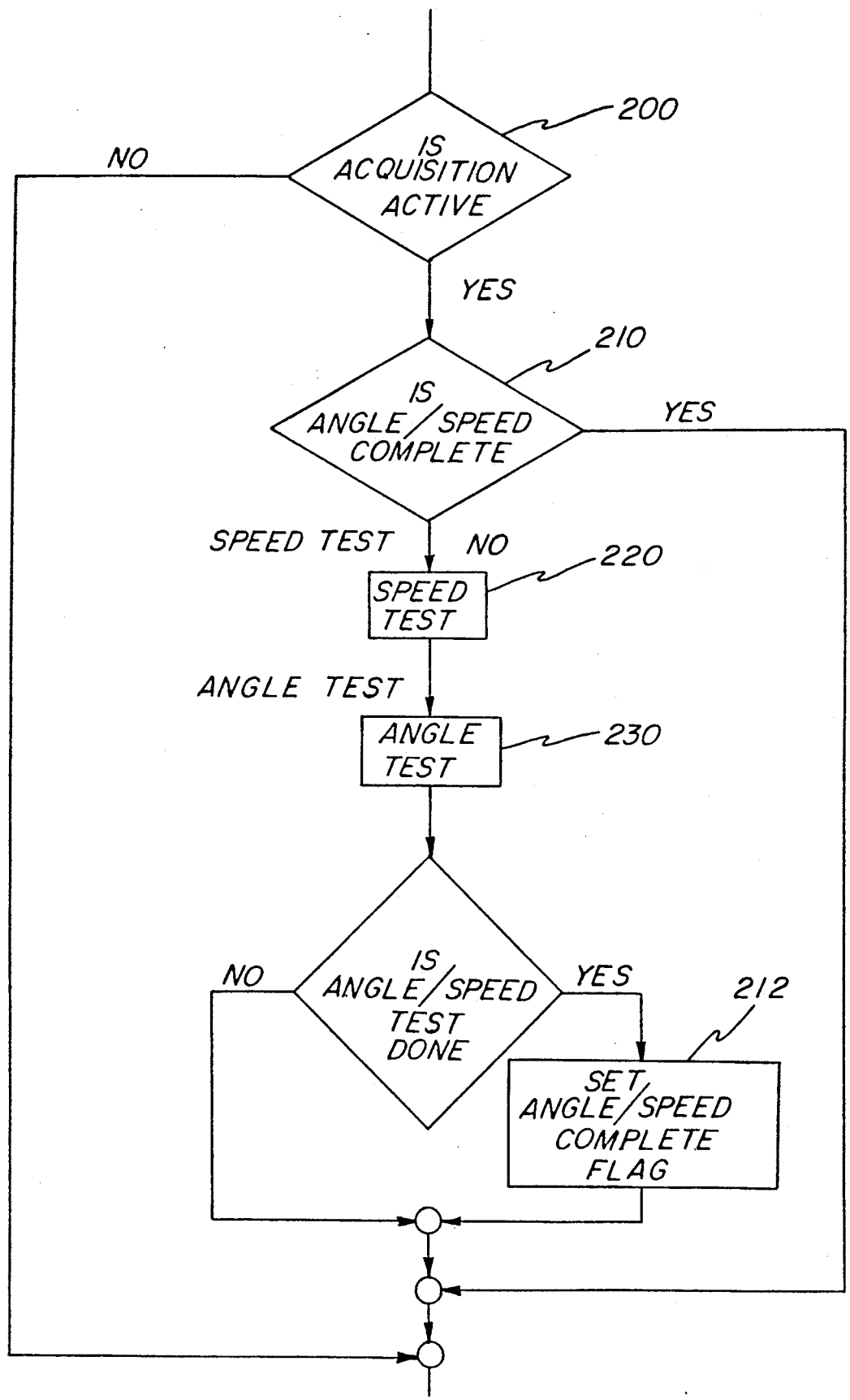
FIG. 12 is a flow chart showing the overall decision making steps involved in the present invention.

Next, the region where the wire is either located or closest to is identified by checking the output of adjacent coils. As shown in the plan view of FIG. 10, the sensor bars are divided into five separate regions: Region 1 is to the left of coil 60a (as viewed in the drawing), Region 2 is between coils 60a and 60b, Region 3 is between coils 60b and 60c, Region 4 is between coils 60c and 60d, and Region 5 is to the right of coil 60d. If the wire 50 is in the position shown by the line 50a, it is clearly in Region 5, and if it is in the position shown by line 50b, it is in Region 3.

Once the region is determined, the distance D of the wire relative to the sensor bar's center point 130 (referred to hereinafter as either XFRONT for bar 40 or XREAR for bar 42) is calculated from one of the following formulas.

| |
|---|
| If in Region 1, $D = -(X1 + X2)/2 - SC$ |
| If in Region 2, $D = (X2 - X1)/2 - SC$ |
| If in Region 3, $D = (X2 - X3)/2$ |
| If in Region 4, $D = (X3 - X4)/2 + SC$ |
| If in Region 5, $D = (X3 + X4)/2 + SC$ | where D is the distance (XFRONT or XREAR) in units of 1/64 inch of the wire from the center point 130; X1, X2, X3, and X4 are the distance values for coils 60a, 60b, 60c, and 60d, respectively; and SC is a scale constant. It is clear that when the wire is to the left of the center point, the distance value D is negative. Using the dimensions given in FIG. 4 for a sensor bar, the scale constant SC will be 4.5 inches.

If the wire is very close to one coil, a weight factor routine will be used to determine the distance of the coils in a region from the wire since accuracy of the coil's voltage to distance curve deteriorates, as illustrated in FIG. 9.

Once the distance of the wire from the center point of either or both sensor bars is finally determined, the position of the vehicle's virtual point 140 (FIG. 3A) may be calculated, and also the angle of the vehicle's axis relative to the wire (assuming the vehicle is in motion), by using one of the following procedures. The first procedure, V1CALC, is used when both sensor bars are reading the wire; the second procedure, V2CALC, is used when only one sensor bar senses the presence of the wire. In either procedure, the result is a measurement of the vehicle's angle and distance from the buried wire 50.

| V1CALC Procedure (two sensor bar data known) |
|---|
| XMEAS = AFS(XFRONT − XREAR) − XFRONT |
| TMEAS = (XREAR − XFRONT) / SENDIS |

Where XMEAS is the measured distance from the virtual point 140 to the wire; AFS is the scaled value of the distance between the load wheel and front sensor bar divided by the distance between the sensor bars; TMEAS is the measured value of the angle of the vehicle relative to the wire; and SENDIS is a scale value used in converting units from distance to radians.

| LIB5 Formulas: |
|---|
| TDEAD = TACT(OLD) + [NEWD * (SIN(TWHEEL))]/WB |
| XDEAD = XACT(OLD) + [NEWD * (COS(TWHEEL)) * SIN(TDEAD))] |

Where TDEAD is the dead reckoning value for the truck angle; TACT is the filtered value of the truck angle, in radians; NEWD is the new value of the distance moved during the present pass; TWHEEL is the value of the wheel angle; WB is the value for the wheel base, in inches; XDEAD is the distance from the wire during dead reckoning; XACT is the filtered value of the truck virtual reference center position with reference to the wire.

| LIB4 Formulas: |
|---|
| if TMEAS + TOFFS = TDEAD |
|   TACT = TDEAD |
| if TMEAS + TOFFS > TDEAD |
|   TACT = TDEAD + [K6 * (TMEAS + TOFFS − TDEAD) + K2] |
| if TMEAS + TOFFS < TDEAD |
|   TACT = TDEAD + [K6 * (TMEAS + TOFFS − TDEAD) − K2] |
| if XMEAS + XOFFS = XDEAD |
|   XACT = XDEAD |
| if XMEAS + XOFFS > XDEAD |
|   = XDEAD + [K1 * (XMEAS + XOFFS − XDEAD) + K4] |
| if XMEAS + XOFFS < XDEAD |
|   = XDEAD + [K1 * (XMEAS + XOFFS − XDEAD) − K4] | where TOFFS is the truck angle offsets due to sensors; K1, K2, K4 and K6 are constants.

The LIB4 AND LIB5 equations are used to calculate XACT & TACT only if "X" and "theta" were previously known, thus a filtered result. If "X" & "theta" not previously known then XACT = XMEAS & TACT = TMEAS.

V2CALC PROCEDURE (ONE SENSOR DATA KNOWN)

Front Sensor Only

| |
|---|
| CA = XFRONT − XFO + CB |
| CB = DIST * SIN(TWHEEL) * AFLT |
| CD = DIST * COS(TWHEEL) |

Rear Sensor Only

| |
|---|
| CA = XREAR − XRO + CB |
| CB = DIST * SIN(TWHEEL) * ARLT |
| CD = DIST * COS(TWHEEL) |

Where Ca, CB and CD are intermediate calculations; XFO is the distance between the front sensor bar 40 and the wire during the previous pass; ARLT is the scaled value of the distance between the load wheel and the rear sensor divided by the wheel base; and DIST is the value of the distance moved since the last microcomputer update.

| |
|---|
| TMEAS = [CA * COS(TMEAS)] + CB + [CD * SIN(TMEAS)] |
| TACT = [TACT + 1/WB * DIST * SIN (THWEEL)] * [(N-1)/N] − TMEAS/N |
| XMEAS(F) = −AF * SIN(TMEAS) − XFRONT * COS(TMEAS) |
| XMEAS(R) = −AR * SIN(TMEAS) − XREAR * COS(TMEAS) |
| XACT = [XACT + DIST * COS(TWHEEL) * SIN(TACT)] * [(N-1)/N] − TMEAS/(N) | where N is a sample count used in the averaging of a single sensor and AF and AR are constants: AF is the distance from the load wheel to the steered wheel sensor bar and AR is the distance from the load wheel to the load wheel sensor bar, in inches.

XTRANS
LATERAL DEVIATION OF FRONT/REAR SENSORS FROM GUIDEWIRE

| |
|---|
| ABSXF = −XACT −(AF * TACT) |
| ABSXR = −XACT −(AR * TACT) | where ABSXF and ABSXR are the absolute filtered values of XFRONT and XREAR, respectively.

LIB2 —STEER COMMAND

CMDU,CMD [FORWARD]=G3 (XACT +XOFSET) +G2(TACT +TOFSET)

[REVERSE]=G3(XACT +XOFSET) −G2(TACT +TOFSET)

TCMD
CONTRIBUTION OF WHEEL THETA TO SERVO COMMAND

OCMD =(G1 * TWHEEL) +(CMDU,CMD)

where CMDU, CMD are intermediate steered wheel commands which include the position (XACT) and angle (TACT) of the vehicle, OCMD is the output command, G1 is the feedback gain for the steered wheel angular position (volts/radians), G2 is the feedback gain for the vehicle angular position (volts/radians), and G3 is the feedback gain for the vehicle's position (XACT) (volts/inches). The total steered wheel output command OCMD, which is a pulse width modulated signal applied to the steered wheel motors, is therefore a combination of signals, taking into account the vehicle's location and angle of the steered wheels.

These formula comprise the microcomputer based mathematical representation of the wire guidance response system. The inputs to these equations include the vehicle's position and angular displacement from the guide wire (derived from sensor coil values), steered wheel angle (derived from the steered wheel encoder 23a), and the distance traveled since the last microcomputer update (from equations V1CALC, V2CALC, LIB4, LIB5 and XTRANS). The output from these equations is an error signal which is converted to a pulse width modulated steering command OCMD (from equations LIB2 and TCMD) which positions the steered wheels to a location in order to maintain the straight line wire guide travel condition.

A simulated wire guide path signal is provided by a wire 132 connected to generator 135 (FIGS. 8 and 10) that produces a 7 kHz signal during calibration. The wire is permanently placed near each of the sensor coils and when the generator 135 is activated, a test signal is generated. The signal thus produced is detected by the sensor coils, with the output of each coil being processed by its respective amplifier. If the output of each is above a predetermined magnitude during the test, then a signal is generate indicating that the guidance hardware is present and working.

During the wire guidance calibration mode, the peak coil values are monitored, and if any coil indicates that it is saturated, a signal is generated to warn the operator to verify that the proper equipment is installed and that the wire guidance signal is functioning properly. During the wire tracking mode, if any sensor coil reads a value in excess of the value detected during the calibration, the vehicle's brakes will be applied and the wire guidance system shut down.

Once the wire has been detected and the system enters the Acquisition Mode, the LIB5 formulas are used to calculate the position of the vehicle based on previous location, speed and the present wheel angle. When in the overshoot mode of operation, the guidance equations continue to drive the vehicle toward the centerline of the wire.

In order to enter the overshoot mode, the vehicle must not have been in the tracking mode. Also, the angle of the vehicle relative to the wire must be below a predetermined maximum limit. To remain in the overshoot mode, the vehicle must be making progress toward wire acquisition by decreasing the distance to the wire during each cycle. During an overshoot, when the vehicle approaches and then passes over the wire, the position information is not as accurate as when the vehicle is aligned with the wire, and the speed of the vehicle will be limited to 1.5 mph.

Figure 13:
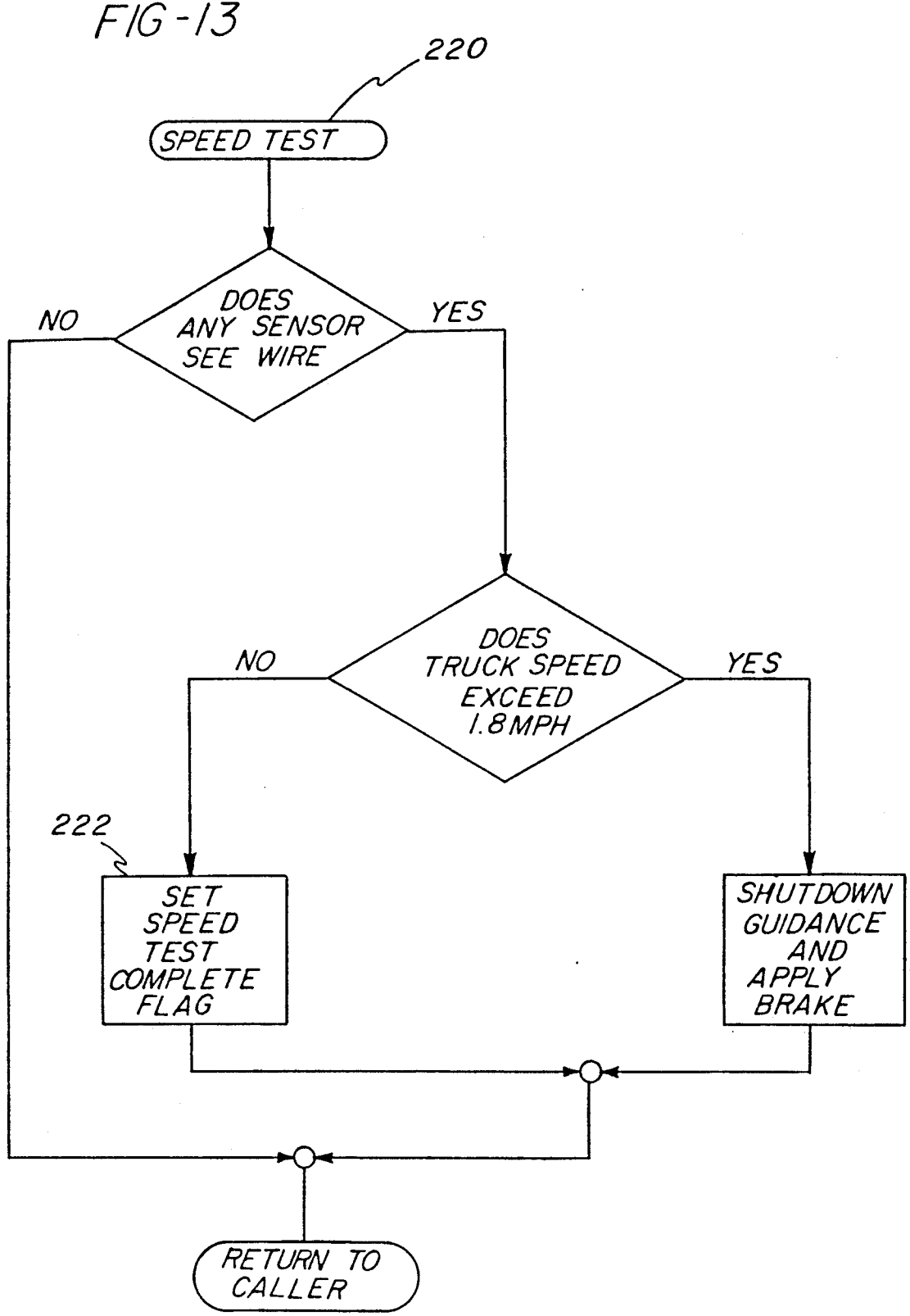
FIG. 13 is a flow chart showing the decision steps relating to speed sensing.
Figure 14:
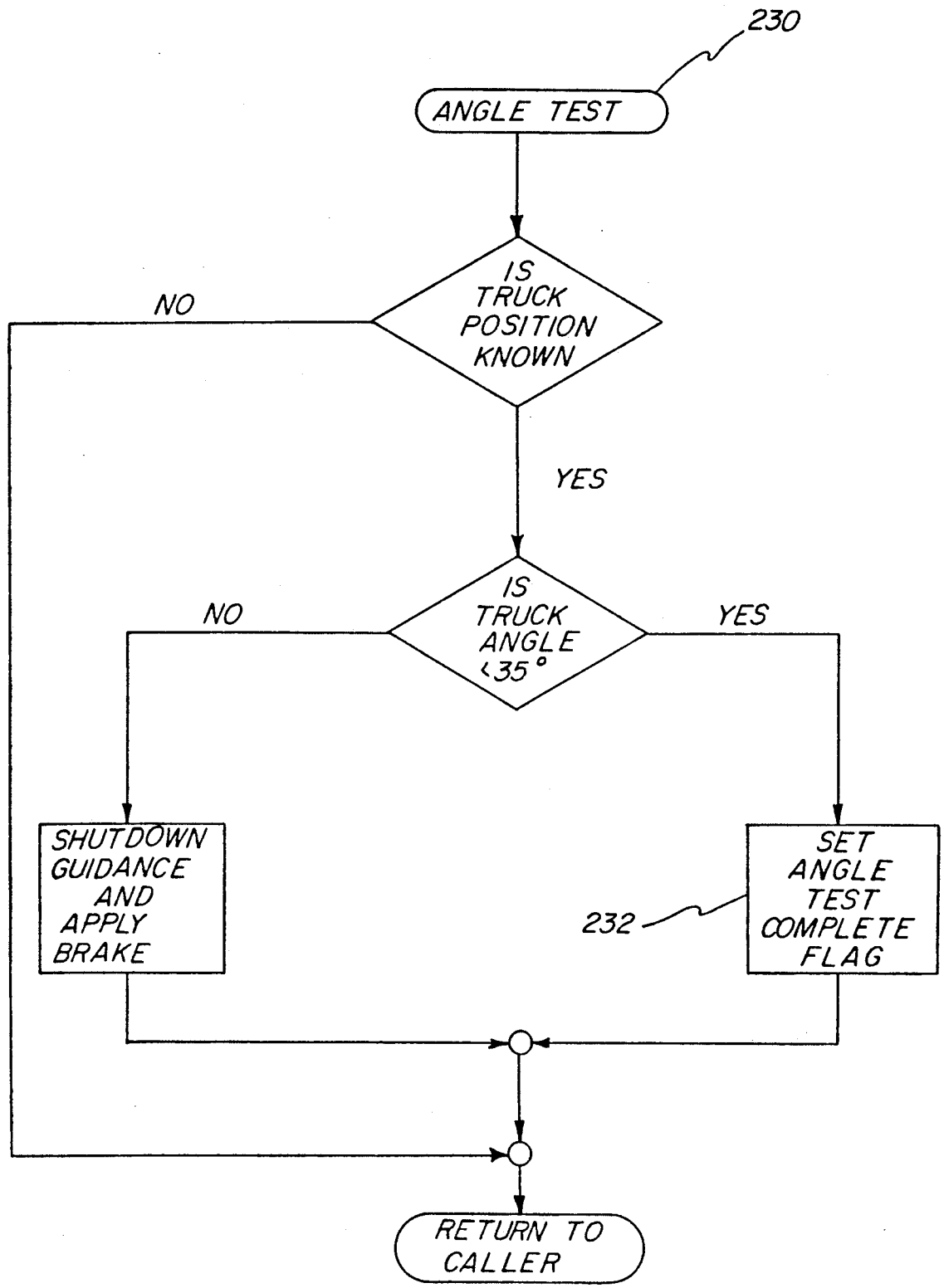
FIG. 14 is a flow chart showing the decision steps relating to approach angle sensing.

Referring now to FIGS. 7 and 11 through 14, the speed of the vehicle is monitored by a pair of tachometers 96, and the angle of approach of the vehicle (TACT) is determined by the microcomputer from the equations described above. The microcomputer also senses the position of the guide switch 65. If the switch 65 is in the Automatic position, indicating that wire guidance has been selected, and the sensors 40 and/or 42 have detected the wire 50, then the decision path of FIG. 12 will be followed. The acquisition mode decision 200 is engaged when the wire has been detected. The angle/speed complete decision flags 210 are complete when both the speed and angle flags from the test of FIGS. 13 and 14 are complete.

The next decision is the speed test 220, shown more fully in FIG. 13. Upon successful completion of this test, the speed flag 222 is set.

The angle of approach test 230 is shown more fully in FIG. 14. Upon successful completion of this test, angle flag 232 is set. Failure of either test will result in shutdown of the guidance system and the application of the vehicle's brakes. To release the brakes, the operator must toggle the guidance switch 65.

Thus, if the sensors are detecting a buried wire, and the speed is in excess of 1.8 mph, or the angle of approach is greater than 35 degrees, then the vehicle's brakes 100 will be applied. Also, the wire guidance mode will be disabled and the steering control returned to the operator on the platform assembly.

While the method herein described, and the form of apparatus for carrying this method into effect, constitute preferred embodiments of this invention, it is to be understood that the invention is not limited to this precise method and form of apparatus, and that changes may be made in either without departing from the scope of the invention, which is defined in the appended claim.

What is claimed is:

1. A method of controlling an operator controlled materials handling vehicle that includes automatic wire guidance for guiding the vehicle in response to a signal carried by a guide wire comprising the steps of
    sensing a speed of the vehicle,
    sensing an angle of approach of the vehicle relative to the wire,
    determining whether the vehicle is in a manual mode of operation or a wire guidance mode of operation, and
    applying the vehicle's brakes to stop the vehicle and disabling the vehicle from further travel if either the speed or the angle of approach is greater than predetermined limits when the wire guidance mode is selected and the guide wire signal is being detected.

2. The method of claim 1 further including the step of requiring the operator to return the vehicle to manual operation before further vehicle travel is permitted.

3. Apparatus for controlling an operation of an operator controlled materials handling vehicle that includes wire guidance for guiding the vehicle in response to a signal carried by a guide wire including
    wire guidance control means for supplying information regarding an angle of approach of the vehicle to a buried wire,
    means for selecting either a manual mode of vehicle operation or a wire guidance mode of vehicle operation,
    means for comparing the speed and the angle of approach of the vehicle to predetermined limits and for generating an out-of-limit condition if either one of said predetermined limits is exceeded,
    means for applying the vehicle's brakes to stop the vehicle and to disable the vehicle from further travel in response to said comparing means detecting said out-of-limit condition when the vehicle is in the wire guidance mode of operation and the guide wire signal is being detected.

4. The apparatus of claim 2 further including means for preventing the further travel of the vehicle until the manual mode of operation has been selected.

* * * * *